Oct. 29, 1929.  E. J. HUBBARD  1,733,598
SPOOL
Filed March 23, 1927
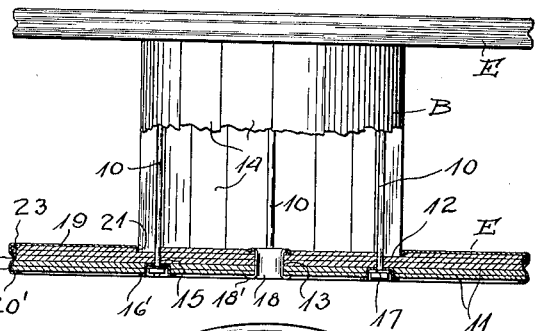
Fig. 1.
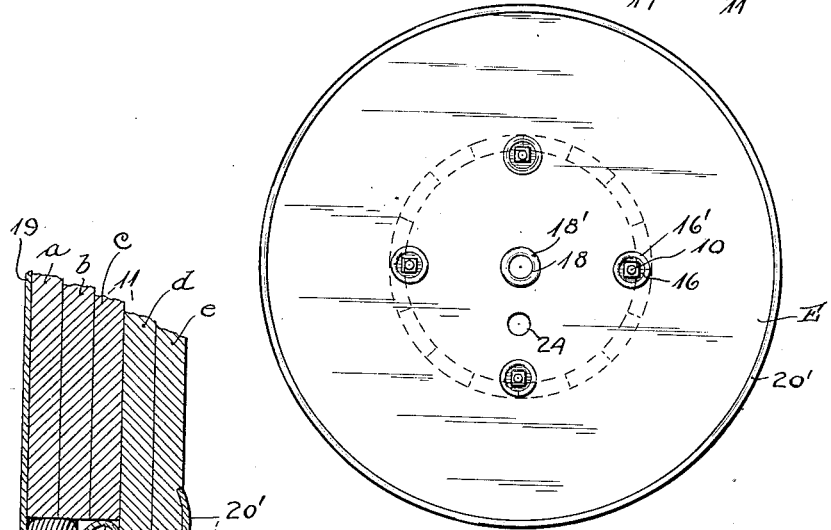
Fig. 2.
Fig. 4.
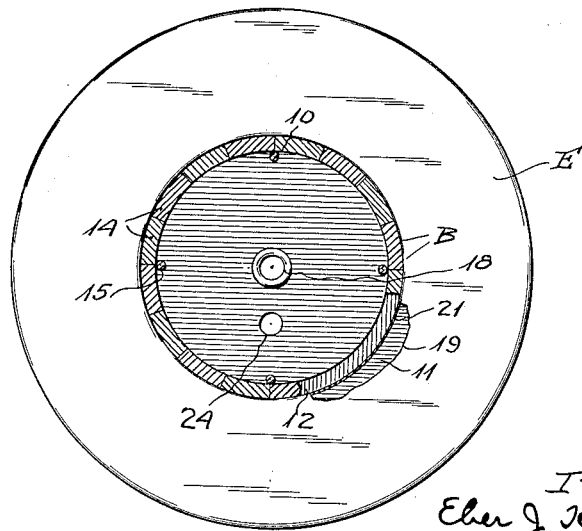
Fig. 3.
Inventor,
Eber J Hubbard
By Brauer, Boettcher & Kenner
Attys.

Patented Oct. 29, 1929

1,733,598

UNITED STATES PATENT OFFICE

EBER J. HUBBARD, OF BERWYN, ILLINOIS

SPOOL

Application filed March 23, 1927. Serial No. 177,506.

My invention relates to spools or reels designed particularly for heavy work such as supporting wires. The object of the invention is to provide a strong and durable spool constructed in greater part of wood with the application of sheet metal where wearing and resisting surface is required and for strengthing and stiffening the wood part. Another important object is to provide a barrel structure of wooden staves with detachable means for securing built-up flange structures to the barrel ends, so that when any of the parts become worn or broken the structure may be taken apart and replacement readily made.

Referring to the drawings:

Figure 1 is a side elevational view of my improved spool partly in diametrical section;

Fig. 2 is an end view;

Fig. 3 is a sectional view on plane 3—3 of Fig. 1; and

Fig. 4 is an enlarged diametrical sectional view showing the application of the sheet metal reinforcing frames to the end disc bodies.

The spool structure comprises the flange or end disc structures E, the barrel structures B and the bolts 10.

Each end disc is built up of a number of laminations or plies 11 and on its inner side has an annular groove 12 concentric therewith and at its center has the bearing spindle receiving opening 13.

The barrel structure comprises the wooden staves 14 which at their ends engage in the annular grooves 12 of the end discs. Just inside of the grooves 12 the end discs have the bolt holes 15 for passage of the bolts 10. In order that the ends of these bolts may be within or flush with the outer surfaces of the end discs countersunk or cup washers 16 are provided to receive the heads and the nuts of the bolts. Below the nut of each bolt a lock washer 17 is preferably inserted. To more securely anchor the cup washers their peripheral sections 16' are deflected laterally to engage against the outer faces of the end discs.

In the supporting spindle opening 13 bearing bushings 18 are provided, these bushings being bent up of sheet metal and having their ends 18' curled around the edges adjacent the openings and sunk a distance into the end discs.

To protect against wear the inner sides of the end discs outside of the barrel structure and also to form a protecting surface or shoe for the end discs, the sheet metal structure 19 is provided having the annular part 19 for engaging against the inner side of the disc and having the outer or flange part 20 for engaging the periphery of the end disc. To securely anchor the sheet metal reinforcing frames the inner edge sections are deflected laterally to form the flanges 21 which engage in the annular grooves 12 in which the barrel structure staves project and the flanges are frictionally held in said grooves by the staves. The flange part 20 of the reinforcing sheet metal frame for facing the periphery of the end disc extends normally beyond the outer face of the respective end disc as indicated in dotted lines at Figures 4 to be deflected radially securely against the outer side of the disc. To strengthen and stiffen the part 20 and at the same time to provide a groove 22 for receiving a driving belt, the part 20 is deflected radially to form the substantially V-shaped groove.

As before explained, the end disc bodies are plied or laminated. In order that dies may be used to form the end discs and also to facilitate the application of the sheet metal reinforcing frames, each disc is of a number of plyboard sections. As shown, two sections are provided, the inner section comprising the layers A, B and C, and the outer section comprising the layers or plies D and E. The diameter of the inner section comprising the plies A, B and C would be such as to clear the corrugation 22, while the diameter of the outer section would be such that the section would fit the cylindrical outer section 20' of the part 20. In order to fill in the otherwise empty space between the corrugations 22 and the inner wall 19 of the reinforcing frame and also to strengthen the inner corner of the frame, a ring 23, preferably of steel, is inserted in the corner before the frame is applied to the end disc at the inner ply section A, B and C. Then the ply section D, E is applied and the section 20' is curled to extend radially against and, if desired, a distance into the outer face of the end disc. Then the bearing spindle bushings 18 are riveted into place and the end disc ply sections will be further supported and strengthened when the bolts 10 are applied to clamp the end discs between the barrel part and the bases and flanges of the washer cups. Each end flange may also have a hole 24 therethrough for receiving a driving plug for rotating the spool when supported on a spindle or shaft.

The improved spool has great strength and durability. Should an end disc become damaged or broken, or should any of the staves become worn or broken, the structure can be taken apart and the broken or worn part readily replaced. The cup washers which receive the bolt heads and nuts will leave the outer faces of the end discs clear so that the spool structures can be readily stacked and so that they will securely seat when received on a vertical spindle.

Having described my invention, I claim as follows:—

1. In a spool structure of the class described, the combination of wood end discs, a barrel structure between the end discs, bolts securing the end discs to the barrel structure, sheet metal reinforcement for each end disc engaging the inner face thereof and secured at its inner end between the barrel and disc, the frame at its outer end surrounding the perimeter of the end disc, and a reinforcing wire at the inner peripheral corner of each end disc held in place by said reinforcement.

2. In a spool of the class described, the combination of non-metallic end discs, a barrel part, bolts securing said end discs to the barrel part, a sheet metal reinforcement for the end discs, and metallic rings inserted in the corners of said end discs between the wood and the sheet metal for reinforcing the corners.

3. A spool or reel comprising a barrel part, non-metallic end discs secured to the barrel part, a thin sheet metal reinforcement extending around the perpheries of the end discs, and an insert between said end disc peripheries and said sheet metal reinforcement for strengthening said reinforcement.

4. A spool or reel comprising a barrel part and end discs secured thereto, said end discs being built up of non-metallic laminations, a thin sheet metal reinforcement on the peripheries of said end discs for holding the laminations together, and a metal band between the end disc peripheries and said reinforcement for forming a strengthenng backing for such reinforcement.

5. A spool or reel comprisig a barrel part and non-metallic end discs secured thereto, thin sheet metal reinforcement around said end discs, and metal bands between the end disc peripheries and said reinforcement forming a backing for the reinforcement against bending or other injuries.

6. A spool or reel comprising a barrel part and laminated non-metallic end discs secured thereto, thin sheet metal facing on the disc peripheries, and a metal filler between the end disc peripheries and said sheet metal forming a backing for the sheet metal.

In witness whereof, I hereunto set my hand this 18th day of March, 1927.

EBER J. HUBBARD.